(12) United States Patent
Takai et al.

(10) Patent No.: US 8,556,086 B2
(45) Date of Patent: Oct. 15, 2013

(54) SOLID-LIQUID SEPARATOR USING ROLLER SYSTEM

(75) Inventors: Toichiro Takai, Ishikawa-gun (JP); Satoshi Ueda, Ishikawa-gun (JP); Toru Awazu, Ishikawa-gun (JP); Motonari Amano, Ishikawa-gun (JP); Kenji Kasama, Ishikawa-gun (JP); Masahiro Yoshida, Ishikawa-gun (JP); Masaaki Watanabe, Ishikawa-gun (JP)

(73) Assignee: Takai Tofu & Soymilk Equipment Co., Ishikawa-Gun, Ishikawa (JP)

( * ) Notice: Subject to any disclaimer, the term of this patent is extended or adjusted under 35 U.S.C. 154(b) by 702 days.

(21) Appl. No.: 12/801,191

(22) Filed: May 27, 2010

(65) Prior Publication Data

US 2011/0114552 A1 May 19, 2011

(30) Foreign Application Priority Data

Nov. 18, 2009 (JP) ................................. 2009-263384

(51) Int. Cl.
*B01D 33/06* (2006.01)

(52) U.S. Cl.
USPC ........... 210/386; 210/398; 210/396; 210/402; 210/408

(58) Field of Classification Search
USPC ............ 99/495; 210/386, 402, 404, 407, 408, 210/455, 484, 498, 499; 162/232, 281, 289, 162/290, 300–302, 323, 257, 358.1
See application file for complete search history.

(56) References Cited

U.S. PATENT DOCUMENTS 5,110,461 A * 5/1992 Abel ............................. 210/158

FOREIGN PATENT DOCUMENTS

| JP | 3392322 | 1/2003 |
| JP | 3417794 | 4/2003 |
| JP | 3537377 | 3/2004 |

OTHER PUBLICATIONS

Machine Translation JP 2001-314999.*

* cited by examiner

*Primary Examiner* — Brian Jennison
(74) *Attorney, Agent, or Firm* — Manabu Kanesaka

(57) ABSTRACT

A solid-liquid separator using a roller system includes a casing, rollers disposed within the casing and each provided with a screen that is formed in the outer periphery thereof with plural pores for separating via the plural pores a solid substance from a solid-liquid substance disposed outside the rollers and filtering a liquid substance toward inside the rollers, inside drums each disposed along the inner circumference of each of the rollers, and a passageway which is formed by means of the screen and the inner drum and which is provided with an outlet. The liquid substance separated by means of the screen is allowed to flow along the passageway, collected at the outlet and discharged from the outlet.

20 Claims, 9 Drawing Sheets

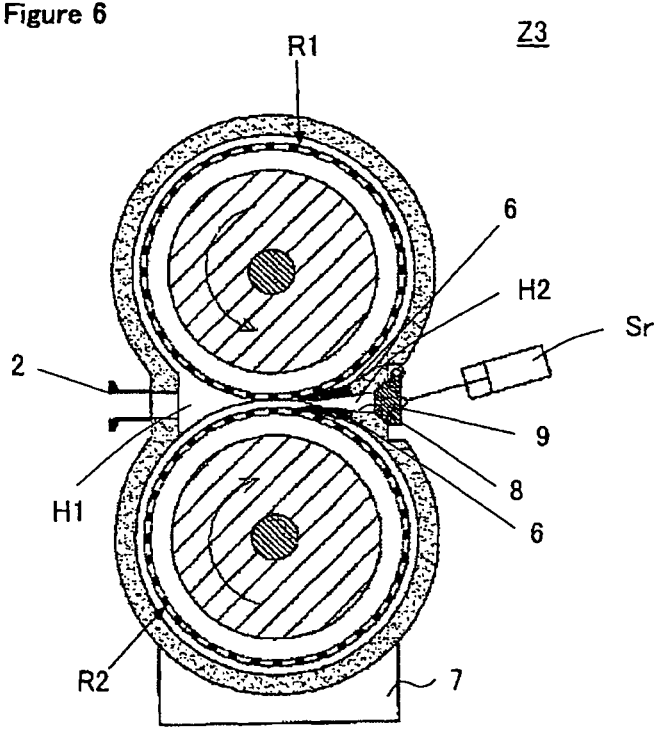

SOLID-LIQUID SEPARATOR USING ROLLER SYSTEM

RELATED APPLICATIONS

The present application is based on, and claims priority from, Japanese Application No. JP2009-263384, filed Nov. 18, 2009, the disclosure of which is hereby incorporated by reference herein in its entirety.

BACKGROUND OF THE INVENTION

1. Field of the Invention

The present invention relates to a solid-liquid separator using a roller system, equipped with rollers each having a screen formed in the outer periphery thereof with plural pores, for separating a solid-liquid mixture into a solid substance and a liquid substance via the plural pores.

2. Description of the Prior Art

There has heretofore been known a solid-liquid mixture separator for separating liquid through filtration, squeezing and dehydration from a solid-liquid mixture having a solid substance and a liquid substance mixed with each other, in which cited as the solid-liquid mixture is a solid-liquid mixture (so-called "boiled soybean-water slurry" that is hereinafter referred to also as "soybean soup" in the description) as obtained through boiling of soybean slurry (so-called unheated soybean-water slurry) that has been acquired by immersing soybeans in water overnight and then scrubbing and crushing the soybeans while being added with water when manufacturing tofu, fried bean curd or soymilk beverage.

As a separator for a solid-liquid mixture, there are a screw-system one comprising a cylindrical screen having plural pores formed therein and a spiral screw driven and rotated within the cylindrical screen and a multistage-system one comprising the screw-system one and a cylindrical screen that has plural pores formed therein for gravity filtration (a screen for filtration) (Japanese Patent No. 3417794 or 3392322, for example). On the other hand, there is a roller-system one in which a solid-liquid mixture is supplied between a pair of right and left rollers facing each other, with their respective axial directions kept in parallel. Japanese Patent No. 3537377 (hereinafter referred to as "Citation 3") points out that one extraction can only be attained with the pair of hollow rollers and performs squeezing with the pair of rollers (primary extraction) the solid-liquid mixture (soybean soup) supplied from above the pair of rollers and squeezing, with the lower surfaces of the rollers and a retention portion (secondary extraction), okara received on the retention portion with which an extraction passageway formed so that the amount to be discharged may be smaller than the amount to be received communicates. In the embodiment of Citation 3, as shown in FIG. 12, the retention portion 5 for okara (a solid substance) is formed so as to be surrounded by the pair of rollers 1, scrapers 4 for scraping the solid component adhering to the rollers, and opposing lower side surface portions 16a extending from opposing central portions 17 of the rollers 1 to the scrapers 4 and, at this retention portion 5, a throttle passageway 50 having a passageway throttled so that the amount to be discharged may be smaller than the amount to be received for giving squeezing pressure to the retained okara is formed. Incidentally, the throttle passageway 50 has a discharge outlet 51 provided with a lid body 53 biased with a spring 52 in the direction of closing the discharge outlet 51. The lid body 53 enables the opening area of the discharge outlet 51 to be varied in accordance with the internal pressure of the retention portion 5.

However, since the roller of the conventional solid-liquid separator using the roller system has a hollow interior and has a structure in which air is difficult to deaerate, pressure (load) of the liquid substance is insufficiently exerted on the screen (stiff load is exerted on the screen). Therefore, when pressure (load) has strongly been exerted on the screen, with the amount of the supplied liquid substance increased, problems of passing minute solid substances through the screen and generating foams inside the screen in a state of foams retained are entailed. This is further described citing an example in which soybean soup (unheated soybean-water slurry, boiled soybean-water slurry) is separated (filtered, dehydrated and squeezed) into soymilk and okara. When the roller is hollow, load of the soymilk is insufficiently exerted on the screen and, when load has strongly been exerted on the screen, with the amount of the supplied liquid substance increased, problems of passing residue through the screen, generating foams inside the screen in a state of foams retained and covering and clogging the screen with bean curd skin (the skin of soybean milk) are entailed. Ordinary soybean soup has minute foams admixed therein at all times and the inside of the screen is always in a state having air retained. Furthermore, even when residue or bean curd skin has adhered to the screen, a problem of providing the apparatus with no means for removing the same is entailed.

As is readable from the shape of a supply inlet 30 shown in FIG. 1 of Citation 3, since paired right and left rollers are used to adjust the amount of the solid-liquid mixture to be supplied mainly by means of its own weight from the above side, it can be inferred that it is difficult to adjust the supplied amount under the influence of the level or the density and viscosity of the solid-liquid mixture within the supply inlet and perform fluid filtration. That is to say, when separating soybean soup (unheated soybean-water slurry, boiled soybean-water slurry) into soymilk and okara, it is desirable to suppress retention of air. However, it is impossible to suppress the retention of air less than a constant amount. It is a matter of course that this is not applicable to a producing method in the absence of a defoaming agent, in which no defoaming agent is used. In addition, the conventional apparatus has a structure incapable of readily disassemble and clean itself and, therefore, does not satisfy the conditions required for food machinery. Moreover, it entails the problems of poor cleaning efficiencies in spite of using a large amount of cleaning liquid and inside retention of a large amount of cleaning liquid and residue.

In view of the above, the object of the present invention is to provide a solid-liquid separator using a roller system, in which a liquid substance is smoothly discharged out through the disposition of an inside drum within a roller and formation of a passageway for the liquid substance between the inside drum and the inside of a screen, the coefficient of discharging retained air and foams is heightened through an increase of the discharging flow rate and, at the same time, the cleaning coefficient is heightened through an increase of the flow rate of a detergent when cleaning the environment. Another object of the present invention is to provide a solid-liquid separator using a roller system, which is capable of filtering the screen under balanced pressure and extracting the liquid substance having suppressed the retention of air and regeneration of foams by the air retention.

SUMMARY OF THE INVENTION

To attain the above object, the present invention provides as the first aspect thereof a solid-liquid separator using a roller system, comprising a casing, rollers disposed within the casing and each provided with a screen that is formed in an outer periphery thereof with plural pores for separating via the plural pores a solid substance from a solid-liquid substance disposed outside the rollers and filtering a liquid substance toward inside the rollers, inside drums each disposed along an inner circumference of each of the rollers, and a passageway which is formed by means of the screen and the inside drum, which is provided with an outlet and along which the liquid substance separated by means of the screen is allowed to flow, collected at the outlet and discharged from the outlet.

According to the present invention, when constant and appropriate pressure has been applied to the screen from outside the rollers using supply means for the solid-liquid mixture (a pump or supply means using its own weight and having controlled the level of the solid-liquid mixture in a hopper that is a supply inlet), balanced pressure is exerted onto the surface of the screen to also induce appropriate internal pressure in a narrow passageway between the screen and the inside drum having no pore and allow the liquid substance to swiftly flow stably. Therefore, the retained air is always pushed and allowed to flow along the passageway at a higher flow rate together with the liquid substance that has passed through the screen. In addition, since the liquid substance always flows rapidly inside the screen, even a solid-liquid mixture containing air does not form air retention. Thus, in the present invention, it is possible to reduce the amounts of the liquid substance or residue and detergent and, at the same time, the air inside the rollers is always pushed out stably to make the air difficult to retain and prevent the conventional various problems resulting from the air retention.

Incidentally, the solid-liquid separator having a roller system may have a configuration equipped with the aforementioned rollers and a roller or fixed plate provided with no screen.

The present invention further provides as the second aspect thereof the aforementioned solid-liquid separator using a roller system, wherein the rollers have roller shafts disposed rearward thereof, the inside drums are disposed along the roller shafts, and the outlets for discharging the liquid substance separated by means of the screen are disposed frontward of the rollers and at positions opposite to the roller shafts. Here, a preferred configuration is such that the inside drums, the rollers, the casing and a front lid having an outlet can be assembled or disassembled relative to the roller shafts.

According to the present invention, when the roller shafts have been rotated with drive means, the inside drums are rotated together with the rollers to flow the liquid substances separated by means of the screen along the passageway U-shaped in cross section collect the same toward the outlet disposed forward and smoothly discharge the same from the outlet. Particularly, at the outlet side within the rollers (end face or bottom surface of the cylindrical rollers), the liquid substances filtered with the screen join together toward the center to further heighten the flow rate. Therefore, the air mixed or retained can smoothly be discharged out. In addition, since the rollers are easy to attach or detach through opening the lid of the casing (front lid), cleaning can readily be performed. Checking the state of the screen is one of the important management items for the primary extraction apparatus, and the present invention can provide a device which anyone can easily disassemble, clean and visually confirm and which can satisfy the conditions required for food machinery.

The present invention further provides as the third aspect thereof the aforementioned solid-liquid separator using a roller system, further comprising paddles attached to a side of the outlets disposed forward of the inside drums. The paddles are attached for the purpose of sending the liquid substance inside the rollers toward the outlet side or scooping up the same.

The present invention further provides as the fourth aspect thereof the aforementioned solid-liquid separator using a roller system, wherein each of the inside drums is provided on a side outer circumference or bottom surface thereof with a projection, a groove or concavo-convex feed blades for scooping the liquid substance inside the rollers or sending it to a forward outlet. The feed blades (a projection, groove or concavo-convex structure (spiral blades having a twisted shape)) are preferably formed spirally (or in a spiral shape having one streak or plural streaks, twisted shape or screw shape) on the outlet side of the rollers, i.e. toward the tip side of the inside drum. They are preferably formed for the purpose of scooping and collecting the liquid substances at the tip surface of the inside drums (the end face or bottom surface of the cylindrical drums) from the inner peripheral side to the center of a circle or sending the same to the forward outlet.

According to the present invention, it is possible for the paddles to scoop up the soymilk remaining on the bottom portion within the rollers and send it to the forward outlet and discharge it from the outlet. In addition, as described above, the air (foams) is more efficiently discharged together with the liquid substances.

The present invention further provides as the fifth aspect thereof the aforementioned solid-liquid separator using a roller system, wherein the casing is provided therein with two or more of the rollers, the liquid substances separated and extracted at the respective rollers are discharged at a position higher than a position of an upper end of a highest roller and filtered, dehydrated and squeezed, with the rollers filled with the solid-liquid substance. Incidentally, the rollers may be disposed in pairs as the first upper and second lower rollers in a horizontal posture (FIG. 1), in pairs as the right and left rollers in a horizontal posture (FIG. 11) or plurally aslant or zigzag (refer to FIGS. 7(a), 7(b) and 7(c)).

According to the present invention, it is possible to make fluid separation capable of performing filtration, dehydration and squeezing in a state of filling each of the rollers with the solid-liquid mixture.

The present invention further provides, as the fifth aspect thereof, the aforementioned solid-liquid separator using a roller system, wherein the solid-liquid substance is soybean soup (unheated soybean-water slurry, boiled soybean-water slurry) used in a process of producing tofu, fried bean curd or soymilk beverage, the solid substance is okara, and the liquid substance is soymilk.

According to the present invention, when separating the solid-liquid mixture into the liquid substance and the solid substance, it is possible to extract the liquid substance (soymilk) having suppressed occurrence of foams generated when the soybean soup (unheated soybean-water slurry, boiled soybean-water slurry) is separated (dehydrated and squeezed) into the soymilk and okara.

According to the present invention, since the inside drum is disposed as along the inner periphery of the roller, the hollow portion in the roller is filled with the liquid substance to reduce the amount of the retained air and, at the same time, heighten the effect of urging the retained air by means of the flow of the discharged liquid substance and enabling the liquid substance containing few foams even in a method using no defoaming agent to be obtained. The so-called fluid extraction can efficiently be performed. In addition, it is possible to prevent the problems of clogging the screen with the solid substance, retaining the air inside in a state of generating foams, and oxidizing the liquid components. Furthermore, in spite of the material and structure of the screen, the pressure of the liquid substance is sufficiently exerted in the presence of the inside drum and, at the same time, the liquid substance that has passed through the screen from the outlet for discharging the liquid substance separated with the screen on the forward side of the roller flows along the prescribed passageway for the liquid substance and is smoothly discharged from the outlet.

The above and other objects, characteristic features and advantages of the present invention will become apparent to those skilled in the art from the description to be given herein below with reference to the accompanying drawings.

BRIEF DESCRIPTION OF THE DRAWINGS

FIG. 6 is a cross section showing a solid-liquid separator using a roller system according to the second embodiment of the present invention.

DETAILED DESCRIPTION OF THE PREFERRED EMBODIMENTS

The solid-liquid separator using a roller system according to the embodiment of the present invention will be described in detail with reference to the drawings.

Figure 1:
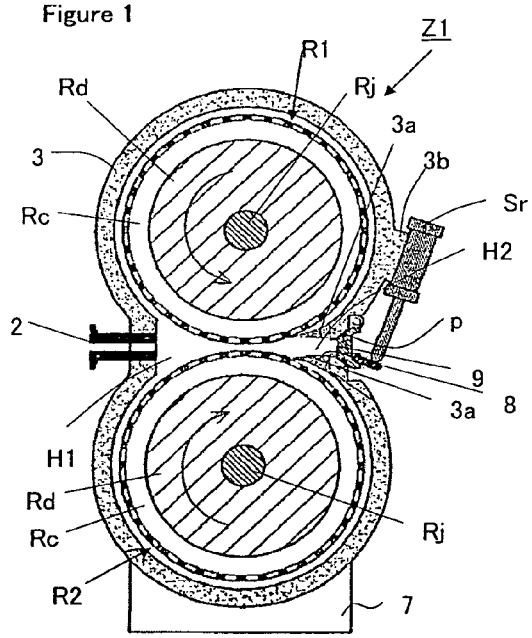
FIG. 1 is a cross section showing a solid-liquid separator using a roller system according to the first embodiment of the present invention.
Figure 2:
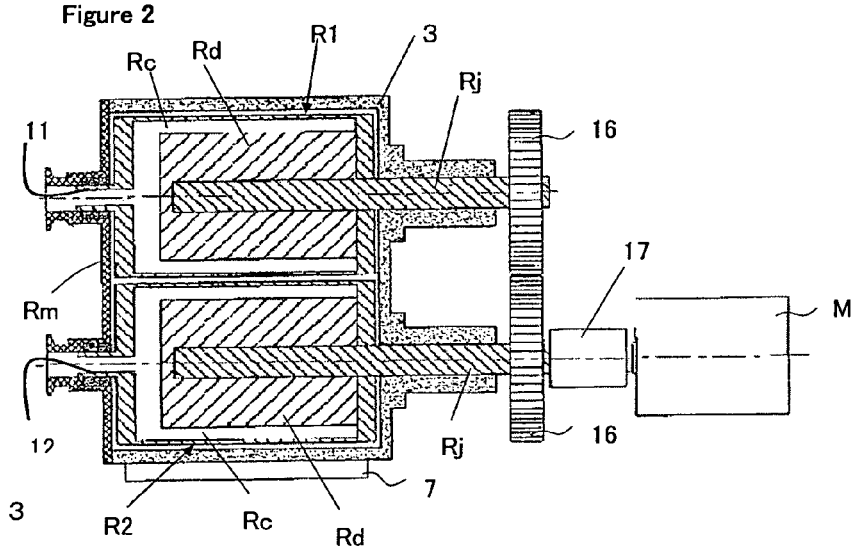
FIG. 2 is a cross section showing upper and lower rollers and a derive mechanism according to the first embodiment.
Figure 3A:
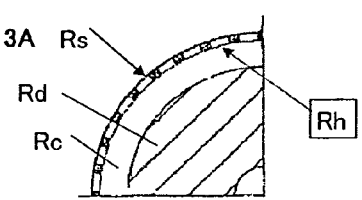
FIG. 3(a) an enlarged cross section illustrating each of the rollers and FIG. 3(b) an enlarged side view illustrating each of the rollers
Figure 3B:
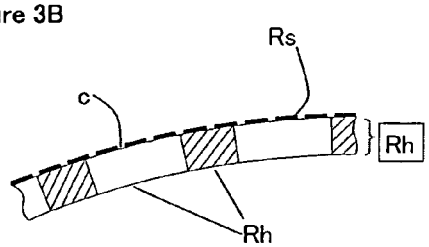

FIG. 1 is a cross section showing a solid-liquid separator Z1 using a roller system according to the embodiment of the present invention. FIG. 2 is a perspective view thereof. FIG. 2 is a cross section illustrating rollers R1 and R2 and their drive mechanism in the solid-liquid separator Z1. FIG. 3 includes a side view illustrating the configuration of the rollers R1 and R2 in FIG. 1.

The solid-liquid separator Z1 using the roller system according to the present embodiment is applied for the purpose of separating soybean soup (a solid-liquid mixture) into a solid substance (okara) and a liquid substance (soymilk) in producing tofu, fried bean curd and soymilk beverage and comprises a base 7, a main body (casing) 3 formed in the shape of a numeral 8 and attached to the base 7, a first roller R1 incorporated into the upper circle of the numeral 8 and a second roller R2 incorporated into the lower circle of the numeral 8. The casing 3 formed in the shape of the numeral 8 in cross section is provided at the center thereof (on the left side in FIG. 1) with a supply inlet 2 for supplying the soybean soup (solid-liquid mixture) while maintaining appropriate discharge pressure (0.0005 to 0.5 Mpa, preferably 0.002 to 0.05 MPa), with the amount of the supplied soybean soup adjusted with a centrifugal pump and on the opposite side, i.e. at the center (on the right side in FIG. 1) on the outside thereof, with a discharge window 8 for discharging the solid substance. A pressure application lid 9 provided with pressure application means is disposed on the discharge window 8 for discharging the solid substance having a constant quality. In the present invention, by appropriately adjusting the balance among the amount of the solid-liquid mixture supplied with supply means, the pressure to be applied during the supply, the number of rotations of the rollers and the pressure of the pressure application lid, it is possible to heighten the ability of processing, enhance the yield of the liquid substance, reduce the solid substance (perform the amount and volume reduction), reduce the minute solid substance in the liquid substance and adjust the conditions to optimum ones meeting the purposes aimed at. Incidentally, it is preferred that the solid-liquid mixture to be supplied should be adjusted before and after the supply means with cooling means (a heat exchanger etc. of a plate, multitubular or corrugated tube type) or heating means (a heat exchanger of a plate, multitubular or corrugated tube type for direct steam-heating or indirect heating). In the case of boiled soybean-water slurry for tofu, though the temperature of the soybean soup immediately after being heated is in the range of 100 to 95° C., it is preferably lowered to a temperature in the range of 60 to 95° C. before the soybean soup is extracted in order to prevent clogging with the skin of soybean milk (the skin of soybean milk).

The paired rollers R1 and R2 are cylindrical rollers of the same shape and size disposed vertically so that their axial directions may be in parallel to each other. The paired rollers R1 and R2 have respective rotation shafts Rj that are driven with a motor M via a coupling 17 and connected to each other with a gear wheel and synchronously rotated, with the rotating directions reversed. As rotary bearings for fixing the rotation shafts Rj, ordinary sliding bearings made of resin are adopted. An inside drum Rd to be described later is attached to each of the rotation shafts Rj, a front lid Rm is disposed on the forward side thereof so as to be clamped between the inside drum Rd and the screen Rs (refer to FIG. 2). Therefore, detachment of the front lids Rm disposed in front of the rollers R1 and R2 and that of the rollers R1 and R2 require no particular professional knowledge, and the maintenance thereof can be accomplished with ease. In addition, since each of the rollers R1 and R2 is supported as fitted in along the roller shaft Rj and can be decomposed through pulling the front lid open and since cleaning after the decomposition of the separator can be attained with ease, the separator satisfies the factor food machinery requires. Incidentally, in the case of using two or more rollers, the peripheral speeds thereof are preferably the same. However, the peripheral speeds may differ from each other. In this case, the effect of a grater is positively made use of to induce secondary pulverization, thereby making it possible to reduce the solid substance and aim at the effect of enhancing the ratio of the solid substance moved to the liquid content, such as the effect of enhancing the concentration of soymilk. Similarly, in the case of enhancing the effect of a grater, it is adopted to increase the number of roller revolutions, decrease the amount to be fed by the pump, use a fixed member as one of the rollers, strengthen the application of pressure by the pressure application lid and, as occasion demands, combine these actions.

Each of the paired rollers R1 and R2 is formed through overlapping of a screen Rs and a punching plate (reinforcing panel) Rh (FIG. 3). The screen Rs is disposed on the outer peripheral surface of each of the rollers R1 and R2 and formed therein over substantially the entire surface thereof with a great number of pores c. A liquid substance (soymilk) extracted from a solid-liquid substance (soybean soup) is passed through the pores c and then recovered from outlets 11 and 12 formed in the end faces of the paired rollers R1 and R2 (FIG. 2). The punching plate Rh is disposed inside the screen Rs and serves to support the shape of the screen Rs and reinforce the screen Rs. The inside drum Rd is disposed inside the punching plate Rh and provided with a passageway Rc so as to efficiently lead the liquid substance to the outlets 11 and 12. The inside drum Rd is provided to reduce an inside hollow portion of each of the upper and lower rollers R1 and R2, made of metal (stainless steel, titanium) or resin, readily eliminate the air within the apparatus at the time the liquid substance flows into the rollers and is discharged from the outlets 11 and 12 and, at the same time, prevents the liquid substance from being disturbed and foamed within the rollers R1 and R2 and moreover reduces the liquid substance remaining within the rollers R1 and R2. Incidentally, the inside drum Rd may be formed in the shape of a sealed void or hollow portion and made of titanium or resin for the purpose of reducing the weight thereof. The liquid substance that has passed through the screen Rs and has been separated passes through liquid substance passageways Rc formed in the presence of the inside drums Rd and in the shape of the letter "U" in cross section and are discharged from the outlets 11 and 12. However, by once setting up continuous pipes from the outlets 11 and 12 up to a position higher than the upper end of the highest roller (FIG. 4), it is possible to perform filtration, dehydration and squeezing, with the inside of the upper and lower rollers R1 and R2 filled with the liquid substance and, as a result, the liquid substance (soymilk) can be filtered without being foamed and, at the same time, since the surface of the screen is not exposed to air, clogging by the skin of soybean milk becomes hard to induce and a defoaming operation to defoam, operation of pushing out foams without inducing air retention and foam-suppressing operation can be expected so as to also enable a long-time operation. Incidentally, the continuous pipes from the outlets 11 and 12 may be set down to a position lower than the upper end of the highest roller and, in this case, a siphon effect can be expected to obtain a better effect of readily discharge the liquid substance (soymilk) and, since the solid-liquid substance little comes into contact with air, it is possible to suppress oxidation of the components, such as protein material, fat or pigment, of the liquid substance (soymilk) or solid substance (okara). Incidentally, it is possible to connect a suction pump or deaerator to the outlets 11 and 12. In addition, treated liquid obtained as separated from the first roller R1 and treated liquid obtained as separated from the second roller R2 may be discharged separately to the exterior or may be mixed and then discharged. Furthermore, the rollers may be vertically disposed right and left in parallel to each other and an extraction device having two such rollers may be adopted. Moreover, though the position of each of the outlets 11 and 12 is limited to the center of the passageway Rc U-shaped in cross section, the pipes disposed forward of the outlets may be at any position. Incidentally, the flow rate of the liquid substance flowing on the passageway Rc is increased in proportion as the diameter of the inside drum is closer and closer to the inside diameter of the roller, i.e. in proportion as the cross section of the passageway Rc is smaller and smaller to obtain merits attaining the effect of pushing out the air inside the screen, effect of washing away the minute solid substances that may clog the pores in the screen and cleaning effect during the cleaning.

The first and second rollers R1 and R2 have the same size and are rotated at the same speed. While the pores c of the screens Rs of the first and second rollers R1 and R2 are the same in size and number, the sizes and numbers thereof may be different. Incidentally, it will suffice that at least one of the pair of rollers R1 and R2 is provided with a great number of pores c. Both the rollers R1 and R2 are not necessarily provided with the pores c. In addition, the paired upper and lower rollers are provided as in the present embodiment, a space can be further reduced in comparison with a conventional configuration. In this embodiment, the first roller R1 on the upper side is rotated from upward to downward and the second roller R2 on the lower side from downward to upward. The solid-liquid mixture is filtered through stepwise application of pressure thereto including a primary extraction between the first and second rollers R1 and R2, i.e. in a prescribed region (region on the supply side) H1, a secondary extraction at a shortest distance portion between the rollers R1 and R2 and a tertiary extraction in a prescribed region (region on the discharge side) H2 and, in this configuration, the solid substance is simultaneously discharged from the discharge window 8 immediately after the liquid substance is filtered onto the inside passageway Rc via the screens Rs of the rollers R1 and R2. Thus, the configuration of increasing the internal pressure stepwise has an effect of preventing the solid substance from re-absorbing the liquid substance in the inside passageway Rc via the screen Rs. In particular, the prescribed region (region on the discharge side) H2 is filled with the solid substance, the internal pressure up to the discharge window 8 provided with a pressure application lid 9 is homogenous, the re-absorption of the liquid substance via the screen Rs is difficult to induce, there is a cushioning effect by the elasticity of the solid substance in the region H2, and the liquid substance containing a small amount of minute solid substances is easy to obtain without forcibly urging the solid substance against the screen Rs.

Since the rollers R1 and R2 do not come into contact with each other, gives a slight degree of pressure to the solid substance to assist filtration of the liquid substance and, at the same time, gives a propulsive force to the solid substance to move toward the discharge outlet, these are disposed at an interval of 0.1 to 10 mm. The interval is preferably in the range of 0.5 to 2 mm particularly for soymilk. When the interval is unduly narrow, while the solid substance has a small water content ratio, and the ability to treat the solid substance is lowered to form a liquid substance containing a large quantity of minute solid substances through forcible throttle. When the interval is unduly wide, inversely, since a liquid substance containing a small amount of minute solid substances is obtained, the propulsive force of the solid substance cannot be obtained and the internal pressure of the prescribed region (region on the discharge side) H2 is not particularly heightened to lower the ability to treat the solid substance, make the water content ratio of the solid substance high and induce clogging as the case may be.

To be specific, the supply inlet 2 for the solid-liquid mixture is disposed between the first and second rollers R1 and R2 and at a position throttled accurately at the center of the casing outer wall in the shape of the numeral 8, and it is configured that the rotation force of the rollers becomes a propulsive force for the solid component most efficiently straightforward via the pair of the rollers R1 and R2 and that the solid component is discharged from the discharge window 8 disposed opposite to the casing outer wall in the shape of the numeral 8. Incidentally, it is optional whether the rotation speed of the first roller R1 is slower or rapider than that of the second roller R2. In addition, in the case where two or more stages of rollers are present, it is unnecessary that all the rollers have the same diameter and that all the rollers are provided with screens having pores. The rollers may be rubber rollers (with concave-convex patterns) or metal rollers. The peripheral speeds (numbers of revolutions) of the rollers may be the same as or different from each other. Even with this configuration, the solid substance (okara) having a constant water content ratio is discharged from the discharge window 8.

By using the same peripheral speed for the paired rollers and the number of revolutions thereof required to be basic, slippage between the solid substance and the rollers is reduced to bring about an effect of suppressing the minute solid component (residue in the case of soymilk) from being generated. By changing the peripheral speeds of the rollers and making the peripheral speeds higher than necessary, an effect of finely pulverizing the solid substance, like a "grater", by means of the screens having pores is brought about, thereby allowing the liquid substance to contain a great deal of fine solid substances and enabling the ratio of extraction from the solid substance to be heightened. In the case of soymilk, there are cases in which a quality rich in fiber can be obtained, the amount of soymilk containing the same concentration can be increased and the yield of tofu products is also increased by about 10 to 30%. Incidentally, though the size and number of the pores c in the screen Rs are optional, when the screen is for soymilk, the pores have a diameter in the range of 0.01 to 1.0 mm and are disposed preferably at pitches of 0.03 to 3.0 mm on the contact surface of the solid-liquid mixture, for example. Since the screen is fabricated with the microfabrication technique, such as laser processing, there are restrictions on the plate thickness, pore diameter and pore pitch. However, the plate may be as thick as possible to have appropriate strength and the screen is preferably provided with a great number of pores having smaller diameters. The aperture ratio is in the range of 3% to 30%, preferably 5% to 20%. The larger pore diameter or aperture ratio induces lacking strength, whereas the smaller pore diameter or aperture ratio makes the filtration ability insufficient. Though the shape thereof may be any of circular, oblong elliptical and rectangular shapes, it does not matter when the maximum opening distance or aperture ratio falls within the above range. The screen is ordinarily made of stainless steel, titanium or resin and has a thickness of 0.1 to 3 mm. In relation to foods and drinks including soymilk, a smaller distance than the above range deteriorates the ability, whereas a larger distance than the above range increases the amount of minute solid substances to affect the feeling on the tongue and induce tasting bad going down and rough feeling. In the case of soymilk for tofu or beverage, the diameter of the pores is preferably in the range of 0.02 to 0.2 mm and the pitches thereof are preferably in the range of 0.06 to 0.6 mm. Incidentally, minute residue may be removed from the soymilk obtained from the primary extraction using a residue-removing apparatus provided with a screen (300 to 100 meshes, opening of 0.05 to 0.15 mm, or pore diameter of 0.01 to 0.1 mm) at a subsequent step. The punching plate (reinforcing panel) Rh has a pore diameter sufficiently larger than the diameter of the pores c in the screen Rs, an aperture ratio higher than the screen Rs and strength large enough to support the screen Rs. The pores may be circular, oblong, elliptical or rectangular. The punching plate may be ordinarily made of stainless steel, titanium or plastic, the thickness thereof is 3 to 10 mm, preferably 5 to 8 mm. The pore diameter is 1 to 10 mm, preferably 3 to 8 mm. The shape of the pores may be any of circular, oblong, elliptical and rectangular shapes.

Figure 5:
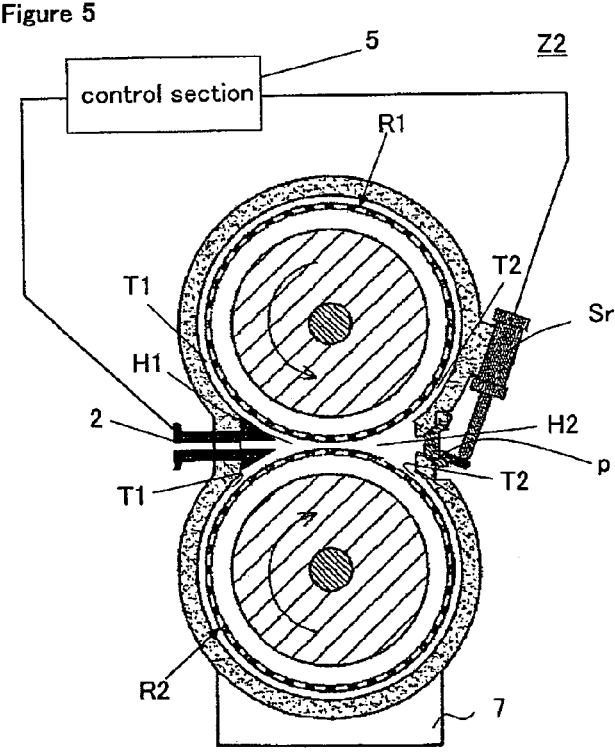
FIG. 5 is a cross section illustrating another example of the first embodiment.

In the present embodiment, the prescribed region (region on the supply side) H1 that is substantially triangular-shaped (delta-shaped) in cross section and defined by the pair of rollers R1 and R2 and the supply inlet 2 from which the solid-liquid mixture is to be supplied is set to be narrower than the prescribed region (region on the discharge side) H2 that is substantially triangular-shaped (delta-shaped) in cross section and defined by the pair of rollers R1 and R2 and the discharge window 8 (FIG. 5). In the configuration of the present embodiment, the solid-liquid mixture supplied is urged against the discharge window 8 in the passageway (protruded just from the front surface and discharged). Since the pressure application lid 9 is disposed on the discharge window 8 by means of a cylinder Sr that is pressure application means, even when the solid-liquid mixture urged against the discharge window 8 collides on the discharge window 8, it is not immediately discharged, but a solid substance (okara) containing a prescribed amount of water is discharged. In this case, the water content of the solid substance (okara) to be discharged is substantially homogeneous without being changed owing to the rotation speeds of the first and second rollers R1 and R2 and the concentration of soybean soup that is the solid-liquid mixture. Incidentally, while a scraper for scraping solid substances (okara and residue) adhering to the screens Rs of the first and second rollers R1 and R2 may be disposed at any position on the outer peripheries of the first and second rollers R1 and R2, it is not disposed at least in the region 112 on the discharge side in the present embodiment, but a tip portion 3a of the casing 3 is disposed adjacent to the outer peripheral surfaces of the first and second rollers R1 and R2 (FIG. 1).

Figure 4:
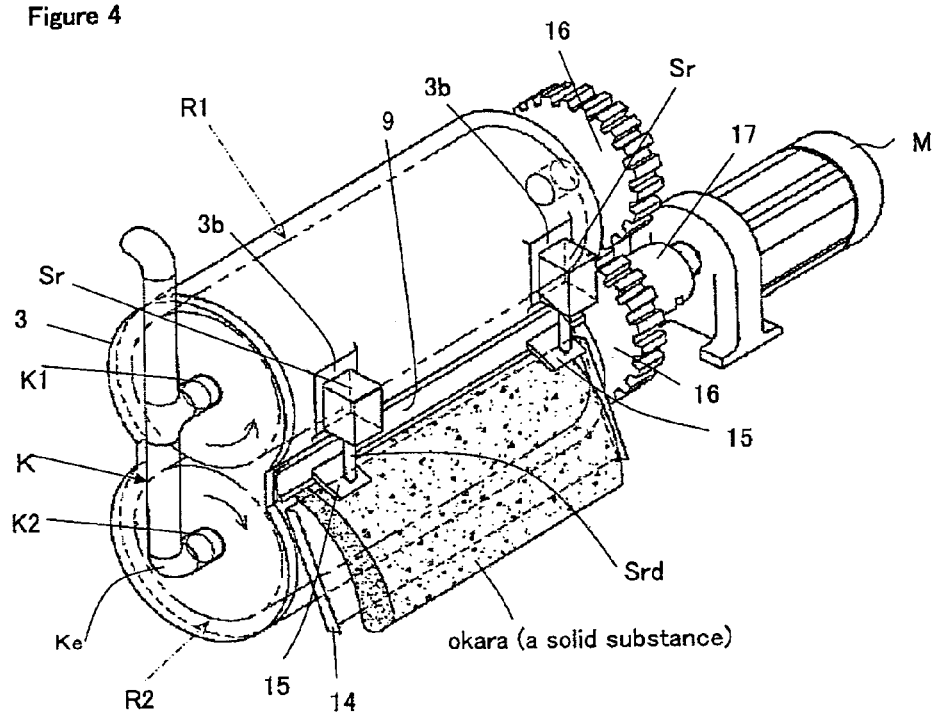
FIG. 4 is a perspective view showing the first embodiment.
Figure 8A:
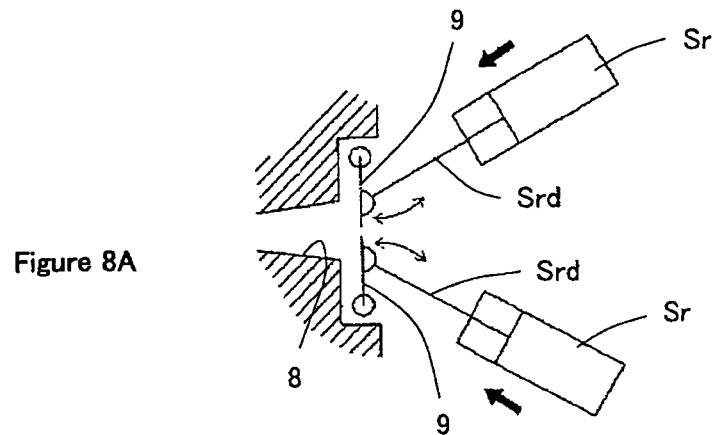
FIG. 8(a) is a diagram illustrating another example of each of the embodiments having a pressure application lid that opens right and left, FIG. 8(b) a diagram illustrating still another example of each embodiment having a pressure application lid to be linearly pushed forward, FIG. 8(c) a diagram illustrating yet another example of each embodiment having pressure application means using a spring, and FIG. 8(d) a diagram illustrating a further example of each embodiment having pressure application means having a weight.
Figure 8B:
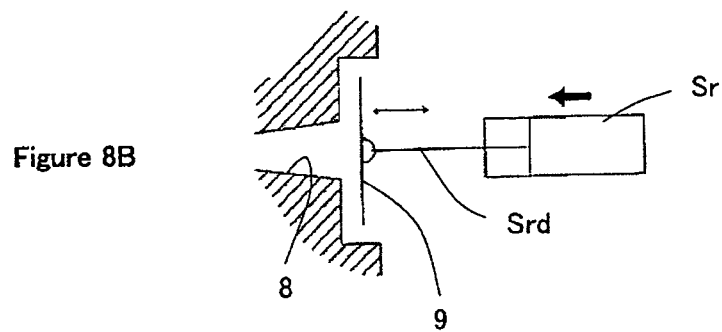
Figure 8C:
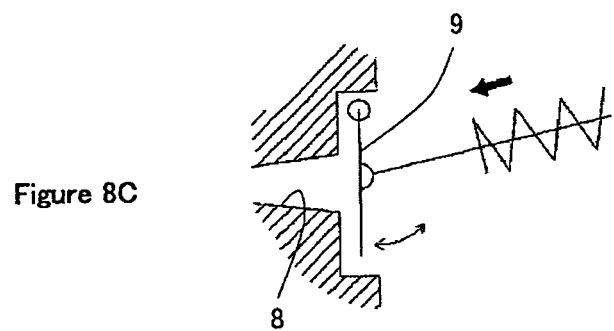
Figure 8D:
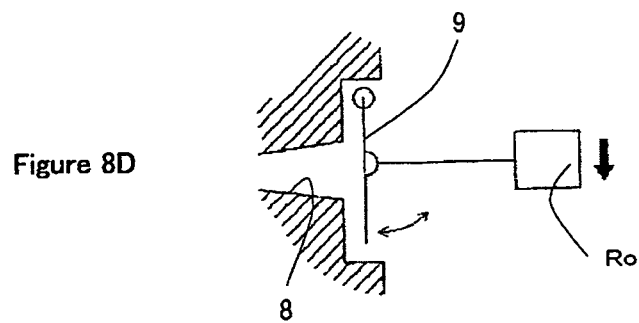
Figure 9A:
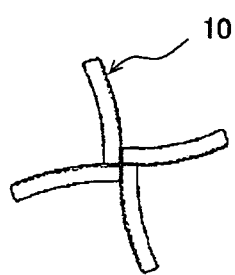
FIG. 9(a) is an explanatory view showing the structure of a paddle on the forward side in the roller, FIG. 9(b) a cross section showing the structure of the roller according to each of the embodiments, and FIG. 9(c) an explanatory view showing another paddle.
Figure 9B:
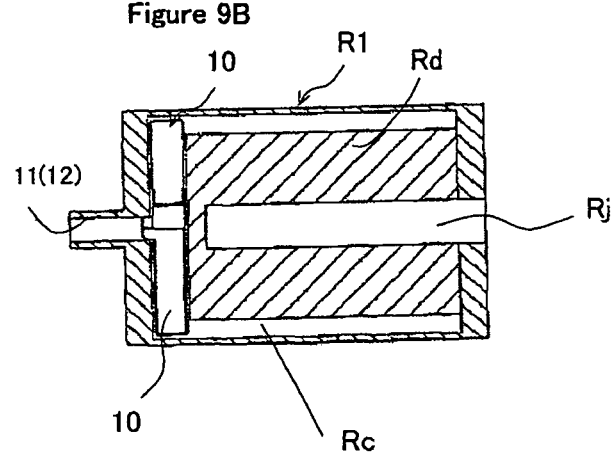

The pressure application lid 9 fulfills its function relative to the discharge window 8 upon being pressurized by the pressure application means as shown in FIGS. 1 to 8, and the pressure application lid 9 pressurized under constant pressure by the cylinder Sr that is the pressure application means is attached to the discharge window 8. The pressure application lid 9 is of a one-side open type, with the upper side kept fixed to the casing 3 and the lower side openable and closable. The cylinder Sr is fixed to a fixing base 3b provided on the outer periphery of the casing 3 at which the upper roller R1 is disposed, and a rod Srd of the cylinder Sr applies pressure to the pressure application lid, directly or via a depressing plate 15 attached to the outside of the pressure application lid 9, in the direction of closing the discharge window 8. The depressing plate is attached to the pressure application lid 9 and made movable by the rod Srd of the cylinder Sr. Since the solid substance is discharged from the lower side along the outer wall of the casing 3 in the one-side open type, the solid substance is prevented from adhering to the cylinder Sr. In addition, since the one side is kept fixed, the discharge window 8 is not rackety to enable a stably pressurized state to be obtained. The present embodiment is provided with one or two cylinders Sr that are pressure application means (FIG. 4). In addition, the casing is provided on the lower side thereof with a chute 14 for discharging the solid substance (okara) from it. Incidentally, it is also possible to discharge okara along the outer circumference of the lower roller R2 and along the outer circumferential circular shape (bent surface) of the casing disposed outside the lower roller without disposing the chute 14. As another example of the present embodiment, a configuration in which the first and second rollers R1 and R2 is disposed in a vertical posture as shown in FIG. 11 may be adopted. That is to say, even in the configuration in which the roller shafts Rj are disposed in the vertical posture, the outlets 11 and 12 are disposed on the upper side and the pipe K is attached to the outlets 11 and 12 in the horizontal direction, the fluid filtration can be performed. In addition, though not shown, a posture opposite to the posture shown in FIG. 11, in which the outlets 11 and 12 are disposed on the lower side and united and attached to a vertical pipe for waste liquid so as to rise up to a position higher than the upper end of the rollers may be adopted, and, by providing the rollers with the paddles as shown in FIGS. 9 and 10, it is possible to provide a configuration capable of discharging retained air and easy to suppress the air retention. Thus, the example in which the roller shafts Rj are disposed in the vertical direction to dispose the paired right and left rollers can best save a space and is excellent in operability. When the outlets for the liquid substance are directed upward, the air can readily be discharged. Though the air retained in the rollers is difficult to discharge in the case of the outlets directed downward, it is possible to forcibly discharge the air using the paddles or feed blades.

Figure 12:
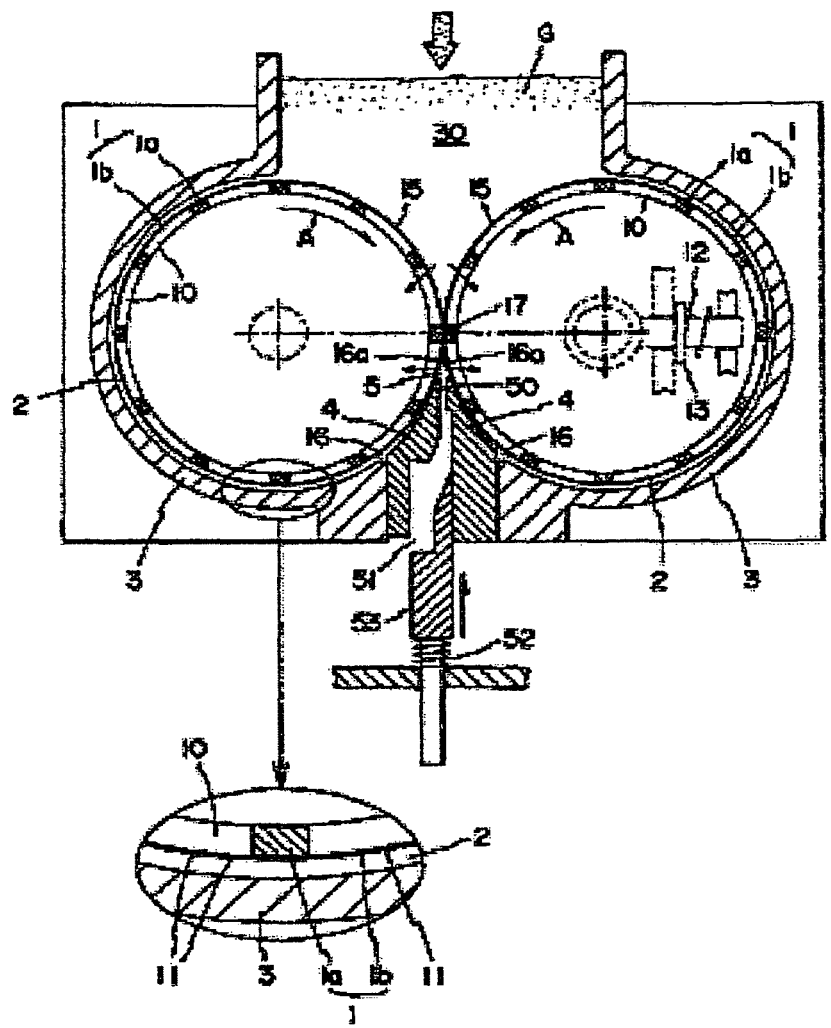
FIG. 12 is a cross section showing an example of a conventional apparatus as shown in Citation 3.

In addition, in order to firmly close the pressure application lid 9 and the discharge window 8 so as not to leak the liquid (liquid substance), it is effective to fit in packing p on the pressure application lid side or discharge window side (FIG. 1). In this case, by increasing the pressure of the pressure application means or using an air pressure controller to increase the air pressure to be supplied in the case of an air cylinder, it is possible to suppress air leak. Particularly, in order to prevent cleaning liquid from leaking during a cleaning operation, it is effective that the packing p is fitted in. Incidentally, in the prior art (FIG. 12), even if tight closure should be attained with a lid body 53, since the outlet is directed downward, the operation of cleaning a conveying passageway for the solid substance is very difficult to make.

The amount of the solid-liquid mixture to be supplied and the pressure application means for pressurizing the pressure application lid 9 are preferably made controllable with a control section 5 as shown in FIG. 4. That is to say, though the degree of throttle is adjusted by a constant pressure control having the pressure application lid 9 provided with constant pressure adjustment means, this is for the purpose of easily changing the pressure application of the pressure application lid 9 in compliance with the state and amount of the solid-liquid mixture to be supplied even during the operation through enabling the value of air pressure supplied with the air cylinder Sr that is the pressure application means to be adjustable in compliance with the amount of the solid-liquid mixture to be supplied. In the case where it is necessary to switch over the degree of throttle every one product, such as tofu and fried bean curd or soymilk beverage, a system capable of setting numerical values can be designed with ease.

Next, the operation of the solid-liquid separator having a roller system according to the present embodiment will be described citing the case where soymilk is produced from soybean soup. First, when soybean soup that is a solid-liquid mixture having soybeans immersed in water overnight, pulverized while being added with water and boiled has been supplied from the supply inlet 2 of the casing 3, with appropriate pressure applied to the soybean soup, it passes through the region H1 on the supplied side, the closest portion between the pair of upper and lower rollers R1 and R2 and the region H2 on the discharge side, thereby separating the soymilk from the soybean soup via the pores c formed in the screens Rs disposed on the outer peripheries of the rollers. Incidentally, while the soybean soup may be introduced through self-weight supply using a hopper, it is preferable that level control is performed so that the level of the soybean soup in the hopper is held constant and more preferable that the soybean milk is supplied under prescribed pressure into the supply inlet 2 with a pump. This is because the self-weight supply little induces filtration in the region H1 on the supply side and, since the force of urging the solid substance toward the discharge outlet depends greatly on the rotation force of the rollers, the phenomenon of a "grater" occurs to facilitate acquisition of the liquid substance having minute solid substances mixed therewith. The present invention utilizes the pump as the supply means to supply the solid-liquid mixture under weak and appropriate pressure (0.0005 to 0.5 MPa), thereby suppressing the phenomenon of the "grater" from occurring, enabling the filtration on the entire surface of the screen facing the region H1 on the supply side and making it possible to use a wide filtration area efficiently. When the filtration area is wide, the filtration time for a prescribed amount of the solid-liquid mixture can be shortened to heighten the filtration ability and consequently the phenomenon of the "grater" is difficult to occur to thereby obtain a liquid substance containing a small amount of minute solid substances. That is to say, in the case of the soybean soup, the amount of the residue in soymilk becomes small. Since the pressure application by the pump suppressed under prescribed constant pressure enables the discharge window 8 to be urged in a fully closed direction by the pressure application lid 9, it can effectively be utilized without leaking the liquid substance from the discharge window 8. That is to say, it is preferred that both the pressure application supply by the pump and the pressure application lid are used in conjunction with each other. In the case where the aperture is retained with a fixed plate in the absence of the pressure application lid, the internal pressure is apt to fluctuate depending on the quality of soybeans, the conditions of boiling the soybean soup, the concentration of the soybean soup, the level of the soybean soup in the tank and the degree of pressure application by the pump, and the phenomenon of the "grater" sometimes occurs to produce a liquid substance containing a great amount of minute solid substances and, as the case may be, there is a possibility of the solid-liquid mixture passing through as it is to leak from the discharge outlet. The same results will be brought about when the pressure application by the pump is much stronger than the pushing pressure by the pressure application lid.

The soybean soup supplied to the rollers R1 and R2 is first filtered in the region H1 on the supply side under small pressure by the pump pressure, then filtered in the portion closest to the paired rollers under slightly large pressure and directed toward the pressure application lid 9. However, it is brought to a strongly pressurized state at a portion (in the region on the discharge side) H2 defined by the upper and lower rollers, passageway between the scrapers and pressure application lid 9 and stepwise filtered (dehydrated and squeezed).

Here, a pipe K for taking out the liquid substance has a structure capable of fluid filtration, in which a pipe K1 for taking out the liquid substance from the upper roller R1 and a pipe K2 for taking out the liquid substance from the lower roller R2 are connected to each other (FIG. 4) so that the position of the upper end of the pipe K2 from the lower roller R2 is higher than the position of the height of the upper roller R1. That is to say, by configuring the pipe K so that deaeration can be attained either from the upper roller R1 or from the lower roller R2, it is possible to extract high-quality soymilk containing no foam and exhibiting no quality variation. Incidentally, as the pipe configuration, it is possible to adopt the configuration in which the liquid substance is taken out from a lower side Ke similarly to the upper side of the pipe shown in FIG. 4. In addition, it is also possible to easily send the liquid even when the pipe is disposed at a position higher than the position of a soymilk tank used at a subsequent step.

Next, another example of a solid-liquid separator Z2 using a roller system, according to the present embodiment, is shown in FIG. 5, in which the tip portion 3a of the casing 3 is not provided, but passageways T1 and T2 are provided for allowing the solid-liquid mixture to run through the outer peripheries of the upper and lower rollers R1 and R2. This example particularly has effects of widening the filtration area to enhance the filtering efficiency, forming on the surface of the screen a thin layer of solid substance, allowing the thin layer to serve as a filter aid though the filtering efficiency and the treatment ability are slightly lowered, and suppressing minute solid substances (residue in soymilk, for example) from being mixed via the screen into the liquid substance. Incidentally, the scraper may be provided at any position on the outer peripheries of the pair of rollers R1 and R2.

Figure 7A:
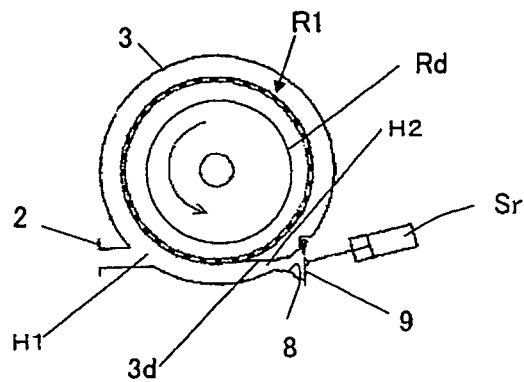
FIG. 7(a) is a diagram illustrating another example of each of the embodiments having a single roller, FIG. 7(b) a diagram illustrating still another example of each of the embodiments having three rollers, and FIG. 7(c) a diagram illustrating yet another example of each of the embodiments having four rollers.
Figure 7B:
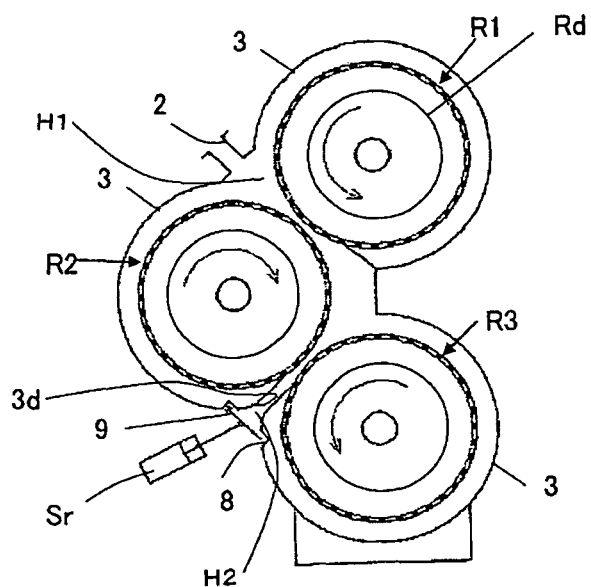
Figure 7C:
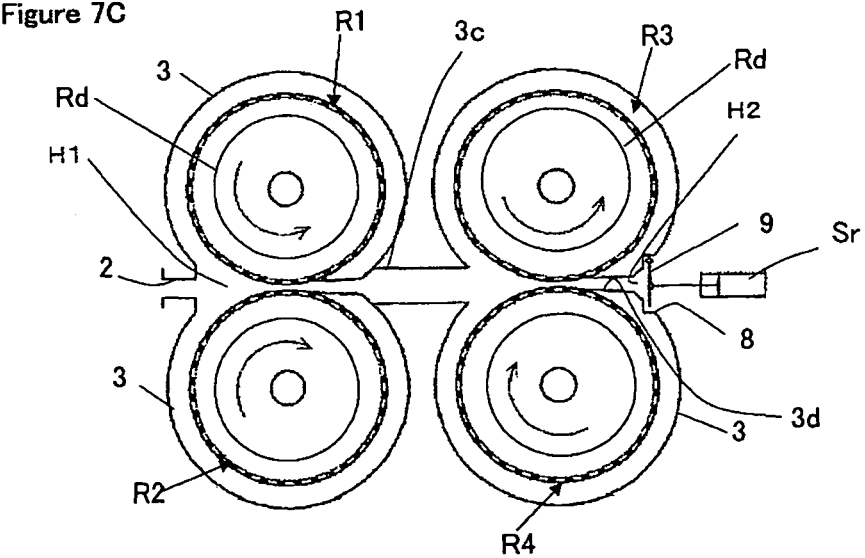

Examples of rollers to be disposed will be described. Also, in the case of a single roller R1 as shown in FIG. 7(a), it is possible to feed a solid-liquid mixture from the supply inlet 2 to the discharge window 8 via the roller R1. FIG. 7(b) shows a configuration in which three rollers R1 to R3 are disposed zigzag to supply the solid-liquid mixture from the supply inlet 2 between the rollers R1 and R2 disposed upward aslant, feed it to and discharge it from the discharge window 8 between the rollers R2 and R3 disposed downward aslant. The structure as shown in FIG. 7(c) is applicable, in which first paired rollers R1 and R2 and second paired rollers R3 and R4 are disposed and connected linearly to each other with a passageway 3c. In the examples shown in FIGS. 7(a) to 7(c), a prescribed wall 3d is provided in the vicinity of the discharge window 8 for directing the flow of the liquid substance (this case has the advantage of heightening the pressure of the solid-liquid mixture in the region H2 on the discharge side). However, a scraper may be substituted for the prescribed wall 3d. In this case, it is also possible to secure the flow of the liquid substance so as to go around in the direction of each of the rollers R1, R2, R3 and R4 (refer to reference symbol or numeral T2 in FIG. 5). Furthermore, though not shown, a multistage line may be configured so that a final liquid substance may be obtained from a liquid substance obtained using a first solid-liquid separator (using a screen having a coarse pore diameter and application of large pressure, for example), by the use of a second solid-liquid separator (using a screen having a smaller pore diameter and application of extremely small pressure). In each of the examples shown in FIGS. 7(a) to 7(c), the casing 3 forms a wall made cylindrical around each of the rollers R1 to R4. Thus, it is possible to dispose the pair of upper and lower rollers, the pair of rollers in parallel (horizontally), plural rollers with their roller shafts disposed vertically and three or more rollers zigzag. Particularly, in the prescribed region (region on the discharge side) H2 in the pair of rollers closest to the discharge window 8, dehydration of the liquid substance or squeezing of the solid substance is finally performed.

Examples of the pressure application lid 9 and air cylinder Sr that is the pressure application means will be described. As shown in FIG. 8(a), there are provided a pair of pressure application lids 9 to each of which a cylinder Sr that is the pressure application means is attached. The configuration shown in FIG. 8(b) is of a direct acting overriding type in which the center of the pressure application lid 9 is pressurized by the air cylinder so as to discharge the solid substance from the outer periphery of the circular discharge window 8. Examples of the pressure application means include an oil pressure cylinder, a water pressure cylinder, a mere weight (reference symbol Ro in FIG. 8(d)) and a spring (FIG. 8(c)). Incidentally, as shown in FIGS. 8(a), 8(c) and 8(d), the cases of one side of the pressure application lid 9 movably fixed to the casing enable stable pressure application to be performed.

The inside drum Rd is attached to the roller shaft Rj of each of the rollers R1 and R2 (FIGS. 1, 2 and 3). The inside drum Rd is made of cylindrical stainless steel, attached to the roller shaft Rj and provided with no pore unlike the screen. The inside drum Rd prevents the soymilk (including residue or cleaning liquid) from retention in the rollers R1 and R2 and, at the same time, fulfills its function to effectively perform dehydration or squeezing of soymilk between itself and the screen Rs formed in the outer periphery thereof with a great number of pores c and to suppress foams from being generated. The inside drum Rd is provided at a forward position thereof with outlets 11 and 12. The outlets 11 and 12 are provided at the forward center of the cylindrical rollers R1 and R2. Therefore, the liquid substance flows along the passageway Rc U-shaped in cross section and formed between the screen Rs and the inside drum Rd within the rollers R1 and R2 and sent out to the outlets 11 and 12. The inside drum Rd may be made of stainless steel and, in view of light weight, of synthetic resin or titanium. The shape of the inside drum Rd may be polygonal in cross section that includes a triangular column, rectangular column and hexagonal column or may have a function to send the liquid substance forward utilizing a snake-like or spiral shape (the shape of a twisted candle, for example) formed by means of the inside drum equipped with a paddle. Otherwise, the inside drum may be tapered to have the diameter thereof reduced gradually toward the forward side (outlets 11 and 12), thereby making the liquid substance easy to flow toward the side of the outlets 11 and 12. The inside drum Rd and rollers R1 and R2 are fixed to the central roller shafts of the rollers with bolts to enable the inside drum Rd and rollers R1 and R2 to be easily detached from and attached to the roller shafts Rj.

Figure 9C:
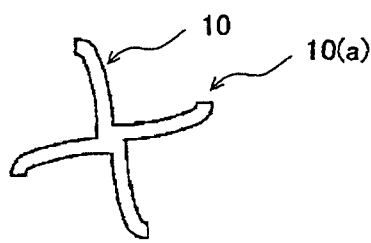

It is preferred that the inside drum is provided on the front end thereof with a paddle 10 (FIGS. 9 and 10). Since the soymilk separated is successively flowing in the rollers R1 and R2, the soymilk in the rollers R1 and R2 is discharged from the outlet 11 as being extruded. At the time of the termination of the operation, however, the soymilk cannot be extruded. While the upper half of the soymilk in the rollers R1 and R2 is discharged from the outlets 11 and 12 via the lower side Ke of the pipe K opened, the lower half of the soymilk is kept remaining in the rollers R1 and R2. In order to discharge the soymilk, though in a small amount, attachment of paddles 10 is effective. To be specific, by attaching plural paddles 10 to the passageway Rc U-shaped in cross section for the liquid substance on the forward side of the roller R1 (to the head of the inside drum Rd), when the roller R1 is rotated, the fixed paddles 10 are rotated at the same peripheral speed. Each paddle 10 has a length reaching the length of the passageway Rc U-shaped in cross section for the liquid substance and has a tip shape 10a formed preferably in a bent shape for easily scooping up the soymilk (FIG. 9(c)). As a result, the remaining soymilk can be discharged from the outlet 11 as being continuously scooped up with the paddles 10.

Figure 10A:
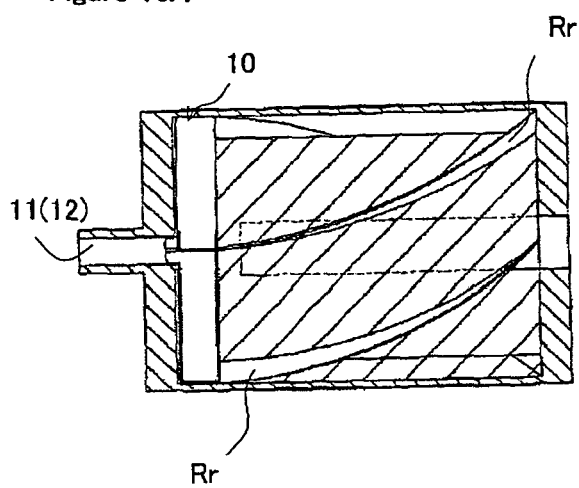
FIG. 10 is a cross section illustrating the structure of the paddle, an example in which a spiral paddle is disposed in the inside drum being shown in FIG. 10(a), another example in which a spiral paddle is fixed to a reinforcing panel inside the screen being shown in FIG. 10(b) and another example in which a spiral groove is formed in the side surface of the inside drum and the inside drum serves also as the reinforcing panel being shown in FIG. 10(c).
Figure 10B:
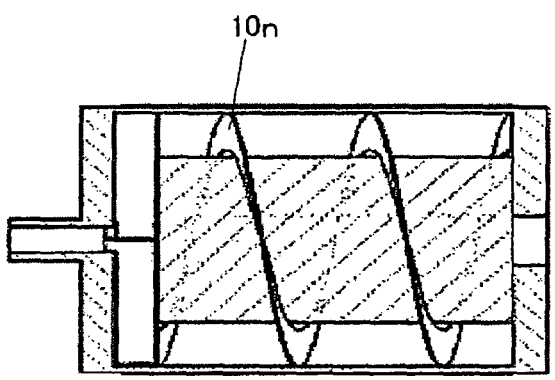
Figure 10C:
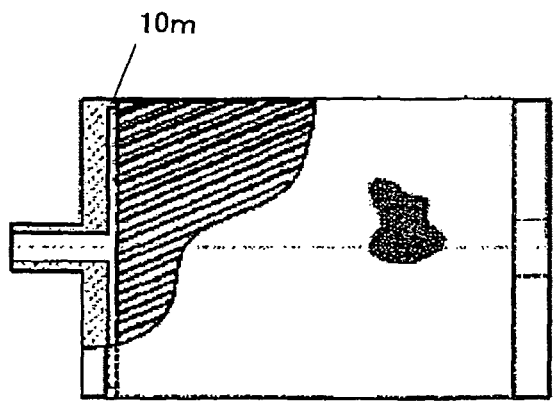
Figure 11:
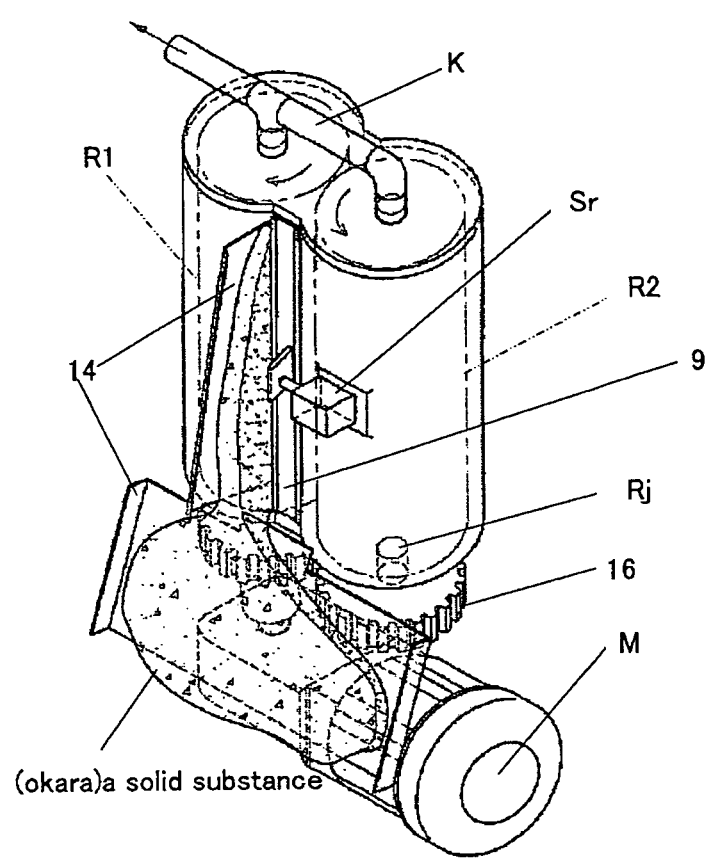
FIG. 11 is a perspective view showing the array of the rollers as another example of each of the embodiments.

In order for the soymilk to be scooped up and sent out to the outlets 11 and 12, as shown in FIGS. 10(a) and 10(b), the inside drum Rd is preferably provided on the outer peripheral wall thereof with a spiral projection Rr or 10n, or inversely in the outer peripheral wall thereof with a groove (not shown). Otherwise, the formation of a concavo-convex peripheral wall combining the two will suffice. Feed blades formed on the outer peripheral walls of the inside drums Rd may be used in conjunction with the paddles. This is further effective. In addition, an effect of efficiently discharge the air retained in the rollers can be induced even when the roller shafts are disposed vertically or aslant to allow the discharge outlets to be directed downward. The paddles 10 may be attached to the roller shafts Rj of the rollers R1 and R2. That is to say, the paddles 10 may be attached rotatably to the leading end of the roller shaft Rj passing through the inside drum Rd and projecting forward. Furthermore, the paddles 10 may be disposed on the inner surface of the screen Rs (inner surface of the reinforcing punching cylinder). Moreover, the inside drum may have a configuration in which the reinforcing punching cylinder and inside drum Rd are used in conjunction with each other and a concavo-convex portion 10m is formed on the surface of the inside drum using the retaining function of the screen and the formation of the passageway in conjunction with each other (FIG. 10(c)).

FIG. 6 is a cross section showing a solid-liquid separator Z3 having a roller system according to the second embodiment of the present invention. In the present embodiment, paired scrapers 6 are attached as directed to the upper and lower rollers R1 and R2, respectively. That is to say, unlike the solid-liquid separator Z2 having the roller system, the passageway T1 and T2 are not provided here. The paired scrapers 6 are disposed to guide, without any modification, the solid-liquid mixture that has been supplied and passed between the upper and lower rollers R1 and R2 in the direction of the discharge window 8. That is to say, a region H2 on the discharge side is defined by the upper and lower rollers R1 and R2, the upper and lower scrapers 6 and a pressure application lid 9 on the wall of a casing 3 that is disposed close to the scrapers. It is possible for the upper and lower scrapers 6 to be attached as being spread in proportion as the scrapers are directed toward the discharge window 8. In this configuration, it is possible to avoid a cake (solid substance) from retention in the passageway between the scrapers to eliminate a state unable to continue the operation (closed state). Since the friction resistance of the solid substance relative to the scrapers is small, the solid substance smoothly flows to expect the enhancement of the effect of the treatment ability. Even when the pressure applied by the pressure application lid 9 is comparatively weak, since the discharge outlet departs from the scrapers, re-absorption of the liquid substance is difficult to perform to easily obtain a solid substance having a small water content ratio and a liquid substance containing a small amount of minute solid substances (the so-called phenomenon of the "grater" is hard to occur). In addition, it is easy to remove the solid substances retained in a region H2 on the discharge side when performing cleaning.

In addition, a region H1 on the supply side is set to be larger than the region H2 on the discharge side. In comparison with the first embodiment, therefore, the solid-liquid mixture to be supplied from the region H1 on the supply side can readily pass through the region H2 on the discharge side to allow the solid substance in a half-extracted state to readily pass in synchronization with the rotation of the rollers. For this reason, the extraction time can be shortened to enhance the apparatus performance, make the phenomenon of the solid substance rubbing the surface of the screens on the rollers (the so-called "grater" phenomenon) hard to occur and enable the liquid substance (soymilk) containing a small amount of minute solid substances (residues in the soymilk, for example) to be obtained. In addition, when the cross-sectional area of the solid substance to be discharged becomes large, the solid substance always filling the region H2 on the discharge side causes the entire discharge pressure of the discharge window 8 to become large and, therefore, there is no case where the force pressing the discharge window 8 becomes insufficient. In other words, even when the pressure of the discharge window 8 is made small, the internal pressure can be heightened and, in addition, the fine adjustment of the internal pressure, i.e. fine adjustment of extraction state, can easily be performed.

According to the present embodiment, therefore, the solid-liquid mixture sent under pressure between the upper and lower rollers is primarily extracted in the region H1 on the supply side, secondarily extracted between the upper and lower rollers, receives the propulsive force toward the discharge window 8 by means of the rotation force of the rollers, passes the upper and lower rollers and passageway (between the scrapers 6 (scraper passageway), is subjected to tertiary extraction in the region H2 on the discharge side and discharged from the gap between the pressure application lid 9 and the discharge window 8. As a result, the solid-liquid mixture is conveyed in a straight stream from a supply inlet 2 and strongly pushes the pressure application lid 9. However, the water content ratio of the solid substance by this pushing force can be adjusted through the adjustment of the pressure applied by an air cylinder Sr.

Here, as the disposition of the pair of rollers R1 and R2, it is possible to adopt not only the vertical disposition, but also lateral disposition. In the case of the lateral disposition of the rollers, as shown in Citation 3, the cylindrical upper and lower faces are directed in the lateral direction and, when the solid-liquid mixture has been supplied from the upper side, it may fall down spontaneously (by gravity) between the pair of rollers R1 and R2. It is also possible that the cylindrical upper and lower faces are directed to the upper and lower ends (the roller shafts are directed longitudinally, vertically or slightly aslant).

Next, the description will be made with respect to the embodiment of the present invention in comparison with Citation 3 (having no description on the inside drum).

In Citation 3, it is difficult to make the solid substance and liquid substance and the qualities thereof homogeneous. To the contrary, in the solid-liquid separator using the roller system according to the embodiment of the present invention, since constant pressure can be exerted onto the discharge window with the pressure application means, it is possible to perform dehydration and squeezing so that the solid substance and liquid substance are made homogeneous.

Citation 3, though not described therein but assumed from FIG. 1 thereof, makes the air retained inside the rollers difficult to deaerate and, in the case of the treated liquid containing fine air like soybean soup, forms a state in which the air is always supplied to the inside of the rollers and retained therein. In addition, it is conceivable from FIG. 1 of Citation 3 that the outside of the rollers is exposed to the air when the upper side contains a small amount of the liquid to be treated and that the skin of soybean milk is formed to readily induce clogging. Since it is also assumable from FIG. 1 of Citation 3 that the supply pressure of the liquid to be treated utilizes the specific gravity to be small, there is no reproduction means capable of extruding the substances with which the pores of the screen have been clogged when the clogging has been induced. To the contrary, the solid-liquid separator using the roller system according to the embodiment of the present invention has a structure in which the pump is used as the supply means to bring the rollers into no direct contact with the air, allows no air layer to exist on either surface of the rollers (screens) and, by providing the inside drum or the inside drum equipped additionally with the paddles, enables the retained air to be discharged along with the liquid substance by means of the inside drum. Therefore, the skin of soybean milk is hard to form and, even when clogging has been induced, the clogging substances can be sent out under pressure with the pump. Thus, the present invention has the advantage of clogging being hard to induce. the skin of soybean milk Citation 3, though not described therein but assumed from FIG. 1 thereof, supplies the solid-liquid mixture to the apparatus using its own weight, only utilizes the falling difference to discharge the liquid substance from the apparatus and requires a next-step apparatus to be disposed below an outlet pipe and, since the pressure for extruding the solid substance depends only on the rotation force of the rollers, it can be estimated that the "grater" phenomenon is likely to occur. Also in Citation 3, there is no description concerning the effect of using the supply means, such as a pump, to supply a solid-liquid mixture in conjunction with a lid body. On the other hand, in the embodiment of the present invention, since the feed pump is used to supply the solid-liquid mixture under small pressure between the upper and lower rollers, the filtration surface on the rollers is wide and can effectively be made use of to enhance the filtration ability and add the rotation force of the rollers, thereby extruding the solid substance toward the discharge outlet. In addition, the separated liquid substance can be sent out to a higher position in the presence of the pump pressure. Therefore, there is no restriction on the height of an apparatus to be used at a next step. In addition, since a rising pipe can be used midway a next delivery step after the separation operation using no defoaming agent in the case of the foamable solid-liquid mixture, a foam-suppressing action can be expected.

In Citation 3, the spring 52 and lid body 53 are provided at positions deep in the lower side of the right and left rollers in the direction of closing the discharge outlet 51. On the other hand, in the embodiment of the present invention, since the upper and lower rollers R1 and R2 are disposed and since the cylinder Sr and scrapers 6 are disposed sideways, the attachment and adjustment of these parts can be performed with ease. Also in the cleaning operation, cleaning can be performed in the embodiment of the present invention in a state in which the discharge window has been opened with the cylinder Sr.

Since Citation 3 adopts the configuration in which the scraper is disposed on the beneath side to make the attachment and adjustment thereof difficult to perform. That is to say, since the lid body 53 of Citation 3 is disposed at a deep position on the lower side of the apparatus and is hard to visually confirm, adjustment, fully closing and cleaning operations are difficult to perform. On the other hand, in the embodiment of the present invention, since the upper and lower rollers R1 and R2 are disposed and since the cylinder Sr and scrapers 6 are disposed sideways, attachment and adjustment of the parts are easy to conduct while visually confirming the parts and it is easy to perform the fully closing and cleaning operations.

As has been described in the foregoing, each of the embodiments has been illustrated citing the case where the soybean soup is extracted to produce soymilk. However, the method of extracting boiled soybean-water slurry or the method of extracting unheated soybean-water slurry may be adopted. In addition, the embodiments are not limited to the production of tofu, fried bean curd or soymilk beverage, but can be applied to a wide variety industrial fields for separating a solid-liquid substance into a solid substance and a liquid substance including production of squeezed fruit beverage, sludge treatment and foodstuff residue treatment. Furthermore, though each of the embodiments of the present invention has been described with respect to the fluid filtration structure, the present invention is applicable to any other structures than the fluid filtration structure.

What is claimed is:

1. A solid-liquid separator using a roller system, comprising:
   a casing;
   a first roller and a second roller disposed within the casing and each provided with a screen that is formed in an outer periphery thereof with plural pores for separating via the plural pores a solid substance from a solid-liquid substance disposed outside the first roller and the second roller and filtering a liquid substance toward inside the first roller and the second roller;
   inner drums each being disposed along an inner circumference of each of the first roller and the second roller;
   outlets each being disposed at a front side of the first roller and the second roller; and
   two passageways, one being formed with the screen and the inside inner drum, which is communicated with the outlet and along which the liquid substance separated by the screen flows, and is collected at the outlet and discharged from the outlet,
   wherein each passageway has a U-shape formed with the screen and the inner drum in a cross-section thereof, and the liquid substance separated by the screen flows along the passageway and is discharged from the outlet when the first roller and the second roller rotate.

2. A solid-liquid separator using a roller system according to claim 1, wherein
   the first roller and the second roller have a first roller shaft and a second roller shaft respectively disposed rearward thereof,
   the inner drums are disposed along the first roller shaft and the second roller shaft, and
   the outlets for discharging the liquid substance separated by the screen are disposed frontward of the first roller and the second roller and at positions opposite to the first roller shaft and the second roller shaft.

3. A solid-liquid separator using a roller system according to claim 1, further comprising paddles attached to a side of the outlets disposed on a front side of the inner drums.

4. A solid-liquid separator using a roller system according to claim 2, further comprising paddles attached to a side of the outlets disposed on a front side of the inner drums.

5. A solid-liquid separator using a roller system according to claim 1, wherein each of the inner drums is provided on an outer circumference thereof with a projection, a groove or concavo-convex feed blades.

6. A solid-liquid separator using a roller system according to claim 2, wherein each of the inner drums is provided on an outer circumference thereof with a projection, a groove or concavo-convex feed blades.

7. A solid-liquid separator using a roller system according to claim 1, further comprising a base present under the first roller and the second roller,
wherein the first roller and the second roller are disposed vertically to each other in the casing and the first roller is arranged higher than the second roller with respect to the base, and
the liquid substances separated and extracted at the first roller and the second roller are discharged at a position higher than a position of an upper end of the first roller and filtered, while the first roller and the second roller are filled with the liquid substance.

8. A solid-liquid separator using a roller system according to claim 2, further comprising a base present under the first roller and the second roller,
wherein the first roller and the second roller are disposed vertically to each other in the casing and the first roller is arranged higher than the second roller with respect to the base, and
the liquid substances separated and extracted at the first roller and the second roller are discharged at a position higher than a position of an upper end of the first roller and filtered, while the first roller and the second roller are filled with the liquid substance.

9. A solid-liquid separator using a roller system according to claim 1, wherein the solid-liquid substance is soybean soup used in a process of producing tofu, fried bean curd or soymilk beverage, the solid substance is okara, and the liquid substance is soymilk.

10. A solid-liquid separator using a roller system according to claim 2, wherein the solid-liquid substance is soybean soup used in a process of producing tofu, fried bean curd or soymilk beverage, the solid substance is okara, and the liquid substance is soymilk.

11. A solid-liquid separator using a roller system according to claim 3, wherein the solid-liquid substance is soybean soup used in a process of producing tofu, fried bean curd or soymilk beverage, the solid substance is okara, and the liquid substance is soymilk.

12. A solid-liquid separator using a roller system according to claim 4, wherein the solid-liquid substance is soybean soup used in a process of producing tofu, fried bean curd or soymilk beverage, the solid substance is okara, and the liquid substance is soymilk.

13. A solid-liquid separator using a roller system according to claim 5, wherein the solid-liquid substance is soybean soup used in a process of producing tofu, fried bean curd or soymilk beverage, the solid substance is okara, and the liquid substance is soymilk.

14. A solid-liquid separator using a roller system according to claim 6, wherein the solid-liquid substance is soybean soup used in a process of producing tofu, fried bean curd or soymilk beverage, the solid substance is okara, and the liquid substance is soymilk.

15. A solid-liquid separator using a roller system according to claim 7, wherein the solid-liquid substance is soybean soup used in a process of producing tofu, fried bean curd or soymilk beverage, the solid substance is okara, and the liquid substance is soymilk.

16. A solid-liquid separator using a roller system according to claim 8, wherein the solid-liquid substance is soybean soup used in a process of producing tofu, fried bean curd or soymilk beverage, the solid substance is okara, and the liquid substance is soymilk.

17. A solid-liquid separator using a roller system according to claim 1, wherein
the first roller and the second roller each comprises a reinforcing panel and the screen covering the reinforcing panel, and
the inside drums are made of a metal or a resin and has no pores thereon.

18. A solid-liquid separator using a roller system according to claim 2, wherein the casing comprises a front lid so that the first roller, the second roller, and the inner drums are removed easily with respect to the first roller shaft and the second roller shaft.

19. A solid-liquid separator using a roller system according to claim 1, further comprising a base present under the first roller and the second roller,
wherein the first roller and the second roller are disposed vertically to each other with respect to the base,
the casing comprises a casing wall having an arc shape along circumferential surfaces of the first roller and the second roller, and
the solid substance passes between the first roller and the second roller and is separated from the solid-liquid substance when the first roller and the second roller rotate.

20. A solid-liquid separator using a roller system according to claim 5, wherein the projection, the groove, or the concavo-convex feed blades is/are arranged spirally on the outer circumference of the plurality of drums.

* * * * *